United States Patent
Yamamoto

(10) Patent No.: US 8,854,702 B2
(45) Date of Patent: Oct. 7, 2014

(54) IMAGE READING APPARATUS AND IMAGE READING METHOD

(75) Inventor: Tetsuichiro Yamamoto, Tokyo (JP)

(73) Assignee: NEC Engineering, Ltd., Tokyo (JP)

( * ) Notice: Subject to any disclaimer, the term of this patent is extended or adjusted under 35 U.S.C. 154(b) by 0 days.

(21) Appl. No.: 13/824,866

(22) PCT Filed: Aug. 9, 2011

(86) PCT No.: PCT/JP2011/004504
§ 371 (c)(1),
(2), (4) Date: Mar. 18, 2013

(87) PCT Pub. No.: WO2012/042726
PCT Pub. Date: Apr. 5, 2012

(65) Prior Publication Data
US 2013/0176604 A1    Jul. 11, 2013

(30) Foreign Application Priority Data
Sep. 28, 2010   (JP) ................. 2010-216406

(51) Int. Cl.
*H04N 1/04*     (2006.01)
*H04N 1/10*     (2006.01)
*G06K 9/00*     (2006.01)

(52) U.S. Cl.
CPC .............. *H04N 1/10* (2013.01); *G06K 9/00026* (2013.01)
USPC ........... 358/474; 358/497; 358/496; 382/313; 348/272

(58) Field of Classification Search
CPC .......... H04N 1/00411; H04N 1/00474; H04N 1/00848; H04N 1/4095; H04N 2201/02416; H04N 2201/04717; H04N 2201/04755; H04N 2201/04791; H04N 1/60
USPC ........ 358/474, 482, 483, 497, 496, 475, 1.13; 382/313, 314, 315; 348/77, 272
See application file for complete search history.

(56) References Cited

U.S. PATENT DOCUMENTS 5,181,104 A * 1/1993 Sugishima et al. ........... 358/500
5,459,589 A * 10/1995 Ohnishi et al. ............... 358/518

(Continued)

FOREIGN PATENT DOCUMENTS

JP    7-98764 A    4/1995
JP    2000-67208 A    3/2000

(Continued)

OTHER PUBLICATIONS

International Search Report dated Nov. 8, 2011 in PCT/JP2011/004504 with English translation.

*Primary Examiner* — Negussie Worku
(74) *Attorney, Agent, or Firm* — McGinn IP Law Group, PLLC

(57) ABSTRACT

An image reading apparatus includes a touch panel that outputs a press position pressed by a finger as coordinate information in a sub-scanning direction, the finger being placed on the surface of the touch panel, a CCD that takes an image of the finger placed on the touch panel from the rear side of the touch panel in a main-scanning direction, and outputs an image signal, and a motor that moves the CCD in the sub-scanning direction so as to follow a rotational movement of the finger based on the movement amount detected by the movement detection unit.

8 Claims, 18 Drawing Sheets

(56) References Cited

U.S. PATENT DOCUMENTS

| | | | |
|---|---|---|---|
| 5,852,686 A * | 12/1998 | Kubo et al. | 382/313 |
| 7,847,981 B2 * | 12/2010 | Igarashi | 358/3.28 |
| 7,872,784 B2 * | 1/2011 | Sato | 358/518 |
| 8,570,600 B2 * | 10/2013 | Harada | 358/1.9 |
| 2005/0073728 A1 * | 4/2005 | Sakaguchi et al. | 358/497 |
| 2008/0130064 A1 * | 6/2008 | Sato | 358/474 |
| 2008/0317290 A1 | 12/2008 | Tazoe | |

FOREIGN PATENT DOCUMENTS

| | | |
|---|---|---|
| JP | 2000-268162 A | 9/2000 |
| JP | 3353878 B2 | 12/2002 |
| JP | 2009-3564 A | 1/2009 |
| JP | 2009-140390 A | 6/2009 |
| JP | 2009-176030 A | 8/2009 |

* cited by examiner

IMAGE READING APPARATUS AND IMAGE READING METHOD

TECHNICAL FIELD

The present invention relates to an image reading apparatus and an image reading method in which a surface image of a subject is read by taking an image of the subject from the rear side of a detection board while rotationally moving the subject on the surface of the detection board, and in particular to an apparatus and a method suitable for reading a rotational fingerprint of a finger.

BACKGROUND ART

As one of the methods for identifying an individual person, there is a method using a fingerprint. In such a method, it is common that an image of a fingerprint is input to an apparatus and the input image is compared with pre-registered fingerprint images. As a method for inputting a fingerprint image, a method in which an inked finger is pressed on a paper surface and a fingerprint is thereby transferred to the paper surface, and then the paper surface, on which the fingerprint is transferred, is read by an image scanner has been used. Further, when a fingerprint having a large range including the sides of the finger is necessary, a fingerprint of the entire finger (rotational fingerprint) is transferred to a paper surface by rotationally moving the inked finger in such a manner that the finger is rolled on the paper surface.

However, in the above-described method, there are problems that a finger is stained with an ink and the method requires a paper. In particular, in the case where a fingerprint is transferred by rotationally moving the finger, unless the finger is rotationally moved on the paper surface in an appropriate manner, the action needs to be repeated again and again. Further, every time the action needs to be repeated, the finger is wiped to remove the adhered ink and a new paper is required. In addition, in the above-described method, every paper on which a fingerprint is transferred needs to be read one by one by using an image scanner in order to convert the image into data, and thus causing a problem that the process is troublesome as a whole.

Accordingly, Patent literatures 1 to 3, for example, proposes a image reading apparatus 80 in which: a finger 83 is placed on a detection surface 82 of a triangular prism (optical prism) 81; the finger 83 is irradiated with light from below by a light source 84; and a rotational fingerprint image is thereby taken by a digital camera 85 equipped with a two-dimensional sensor such as a CCD (solid image-taking device), as shown in FIG. 20.

To obtain the rotational fingerprint image, the digital camera 85 is driven in a successive manner at a frame rate of 30 fps to 60 fps, for example, while a subject person rotationally moves his/her finger 83 on the detection surface 82, so that the entire image of the finger 83 from one side to the other side of the finger is taken as moving images. After that, images of a plurality of frames, which are obtained by the moving-image-taking process, are combined by a synthesis processing unit 86 and a one freeze-frame image is thereby generated. In this way, image data of the rotational fingerprint obtained by converting images from one side to the other side of the finger 83 into one image is obtained.

CITATION LIST

Patent Literature

Patent literature 1: Japanese Patent No. 3353878
Patent literature 2: Japanese Unexamined Patent Application Publication No. 2000-268162
Patent literature 3: Japanese Unexamined Patent Application Publication No. 2000-67208

SUMMARY OF INVENTION

Technical Problem

However, in the image reading apparatus 80 disclosed in Patent literatures 1 to 3, it is necessary to fixedly dispose a structurally-large digital camera and thus necessary to secure a space for disposing the digital camera inside the apparatus, and thereby causing a problem that the overall size of the apparatus becomes larger.

Further, in the above-described image reading apparatus 80, one freeze-frame image is created from images of a plurality of frames. Therefore, unless the finger 83 is rotationally moved at a uniform speed, distortions occur at the joints between images in the synthesized freeze-frame image. However, it is very difficult to rotationally move the finger 83 at a uniform speed. Therefore, it is necessary to provide the apparatus with a configuration for correcting distortions when the image is synthesized and/or for removing the distortions from the synthesized image. As a result, the sophisticated image correcting function is indispensable to the apparatus. Therefore, the circuit and software for signal processing become complicated, and thus causing a problem that the apparatus's price becomes higher.

Accordingly, the present invention has been made to solve the above-described problems and an object thereof is to provide an image reading apparatus capable of reducing the size of the apparatus, obtaining an excellent image with no or small distortion without using any complicated signal processing, and thereby reducing the price of the apparatus.

Solution to Problem

To achieve the above-described object, an image reading apparatus according to an embodiment of the present invention is an image reading apparatus that reads a surface image of a subject while rotationally moving the subject in a sub-scanning direction, including: a touch panel that outputs a press position pressed by the subject as coordinate information in the sub-scanning direction, the subject being placed on a surface of the touch panel; a line sensor that takes an image of the subject placed on the touch panel from a rear side of the touch panel in a main-scanning direction, and outputs an image signal; detection means for detecting a movement amount of the press position of the subject to the sub-scanning direction on the touch panel based on the coordinate information output from the touch panel; and sensor conveyance means for moving the line sensor in the sub-scanning direction so as to follow a rotational movement of the subject based on the movement amount detected by the detection means.

Further, an image reading method according to an embodiment of the present invention is an image reading method of reading a surface image of a subject while rotationally moving the subject in a sub-scanning direction, including: outputting a press position pressed by the subject as coordinate information in the sub-scanning direction; detecting a movement amount of the press position of the subject to the sub-scanning direction based on the coordinate information; and moving a line sensor in the sub-scanning direction so as to follow a rotational movement of the subject based on the movement amount.

Advantageous Effects of Invention

As described above, according to the present invention, it is possible to reduce the size of an apparatus. Further, it is possible to obtain an excellent image with no or small distortion without using any complicated signal processing and thereby to reduce the price of the apparatus.

DESCRIPTION OF EMBODIMENTS

Next, exemplary embodiments for carrying out the invention are explained in detail with reference to the drawings.

Figure 1A:
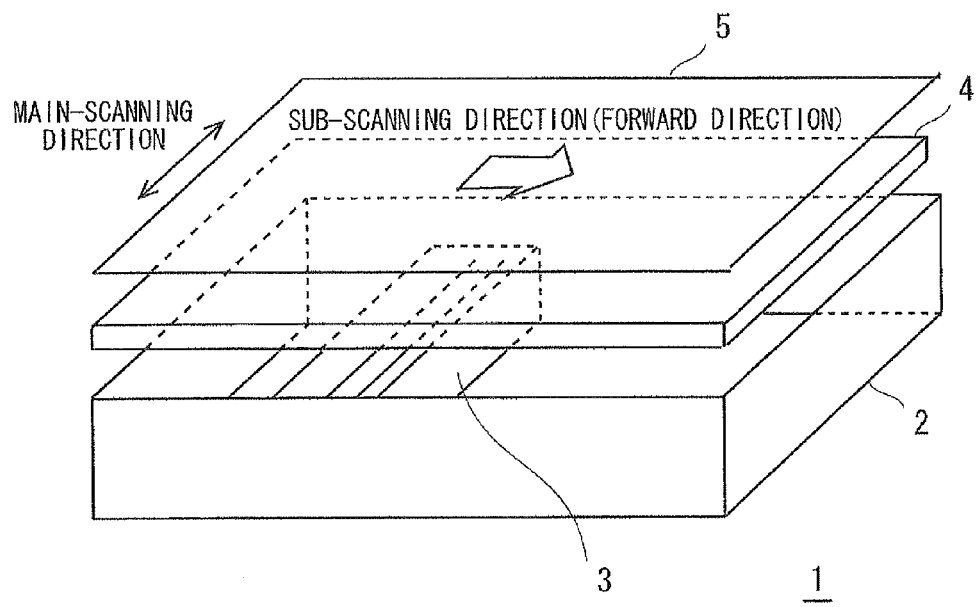
FIG. 1A is a perspective view showing an exemplary embodiment of an image reading apparatus according to the present invention.

FIG. 1A shows an exemplary embodiment of an image reading apparatus according to the present invention. As shown in the figure, this image reading apparatus 1 includes a scanner housing 2, a read unit 3 that is housed inside the scanner housing 2 and configured so as to be able to move in a sub-scanning direction by motor driving, a transparent platen glass 4 disposed above the scanner housing 2, and a transparent touch panel 5 bonded on the platen glass 4. Note that although the illustration is omitted, a slide rail(s) is disposed inside the scanner housing 2. Further, a gear(s) that engages with the slide rail(s) and a motor that drives the gear(s) are disposed in the read unit 3.

Figure 1B:
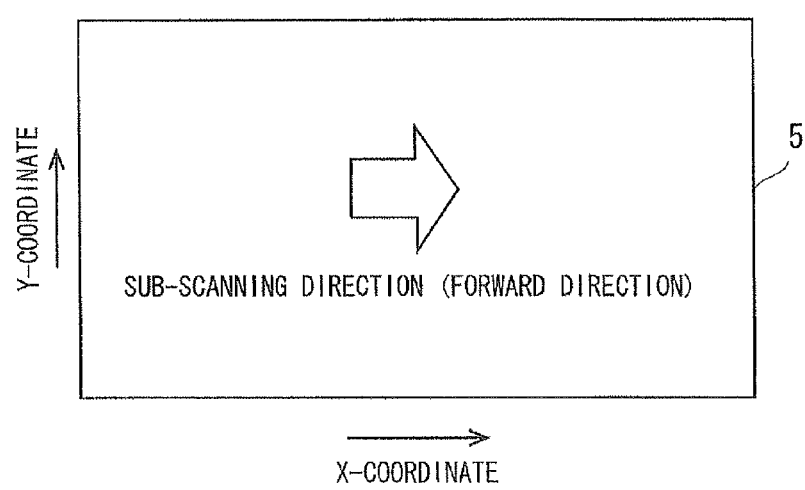
FIG. 1B is a plane view showing an exemplary embodiment of an image reading apparatus according to the present invention.
Figure 2:
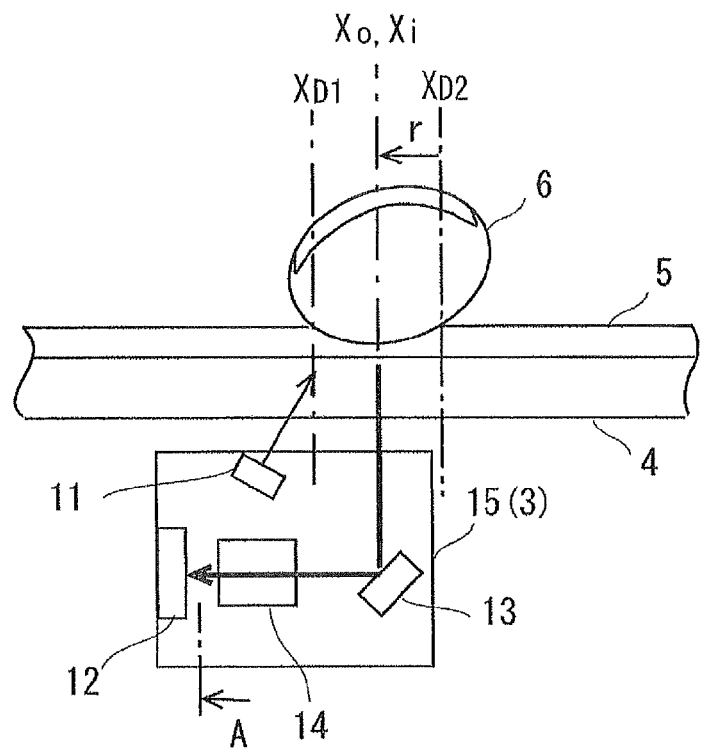
FIG. 2 is a cross section of an image reading apparatus.

As shown in FIG. 1B, the touch panel 5 is formed in a rectangular shape as viewed from the top, for example, and is used as a placement board on which a finger 6 is placed as shown in FIG. 2. As shown in FIG. 1B, in the touch panel 5, the short side direction (main-scanning direction) is defined as the Y-coordinate and the long side direction (sub-scanning direction) is defined as the X-coordinate. Further, the position at which a finger 6 is placed is output as coordinate information. Note that there are various types of touch panels, including a resistive film type, a capacitance type, and an optical type. Any of these touch panels may be used as the touch panel 5.

The platen glass 4 functions as a support board when a finger 6 is placed on the touch panel 5, and is composed of a transparent glass having a strength higher than that of the touch panel 5.

As shown in FIG. 2, the read unit 3 includes a light source 11 that irradiates a finger 6 placed on the touch panel 5 with light, a CCD 12 that takes an image, a mirror 13 and an optical lens 14 that guide a fingerprint image of the finger 6 onto the light-receiving surface of the CCD 12, and a unit housing 15 that houses the light source 11, the CCD 12, the mirror 13, and the optical lens 14.

Figure 3:
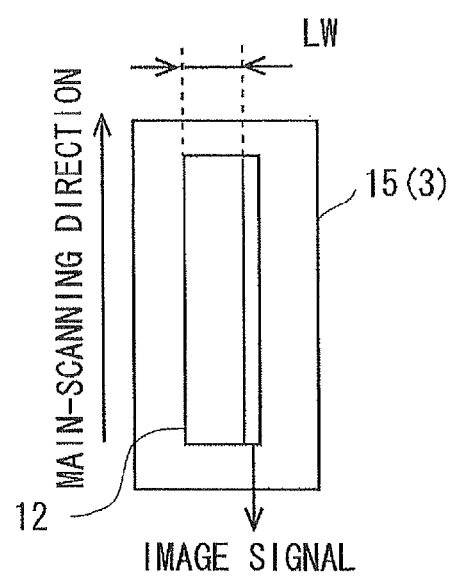
FIG. 3 is a plane view of a CCD shown in FIG. 2 (viewed in a direction indicated by an arrow A)

The CCD 12 is a one-dimensional CCD (line sensor) that takes an image on a line-by-line basis, and is disposed so as to extend in the main-scanning direction as shown in FIG. 3. Note that the width (line width) LW of the light-receiving surface of the CCD 12 is larger than the width of one division of the scale along the X-coordinate of the touch panel 5.

Figure 4:
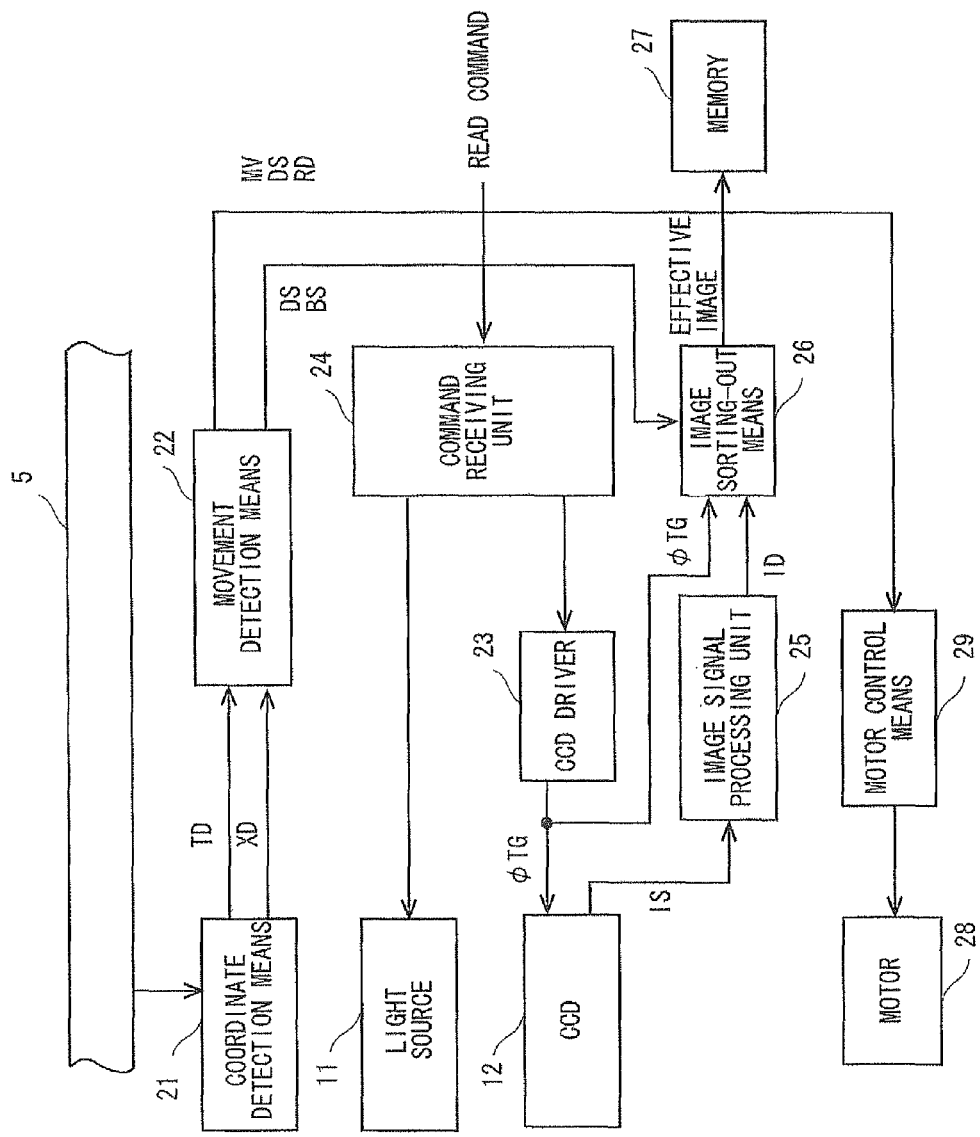
FIG. 4 is a block diagram showing a functional configuration of an image reading apparatus.

FIG. 4 is a block diagram showing a functional configuration of the image reading apparatus 1. As shown in the figure, the image reading apparatus 1 includes coordinate detection means 21 for detecting the position of a finger 6 on the touch panel 5, movement detection means 22 for detecting the movement amount of the finger 6 based on the detection result of the coordinate detection means 21 and outputs a movement detection signal DS, a light source 11, a CCD 12, a CCD driver 23 that drives the CCD 12 by supplying an image output signal φTG and makes the CCD 12 output an image signal (analog signal) IS at regular intervals, a command receiving unit 24 that gives an instruction to the CCD driver 23 according to an external read command (read instruction) and turns on the light source 11, an image signal processing unit 25 that performs predetermined signal processing such as an A/D conversion for the image signal IS output from the CCD 12, image sorting-out means 26 for sorting out image data (digital signal) ID output from the image signal processing unit 25 into effective image data and ineffective image data based on the movement detection signal DS of the coordinate detection means 21 and the image output signal φTG of the CCD driver 23, a memory 27 that stores the effective image data output from the image sorting-out means 26, a stepping motor (hereinafter called "motor") 28 that moves the read unit 3 (see FIGS. 1A and 1B) in the sub-scanning direction, motor control means 29 for controlling the motor 28, and so on. Note that all of these coordinate detection means 21 to motor control means 29 are disposed inside the read unit 3 shown in FIGS. 1A and 1B.

Figure 5:
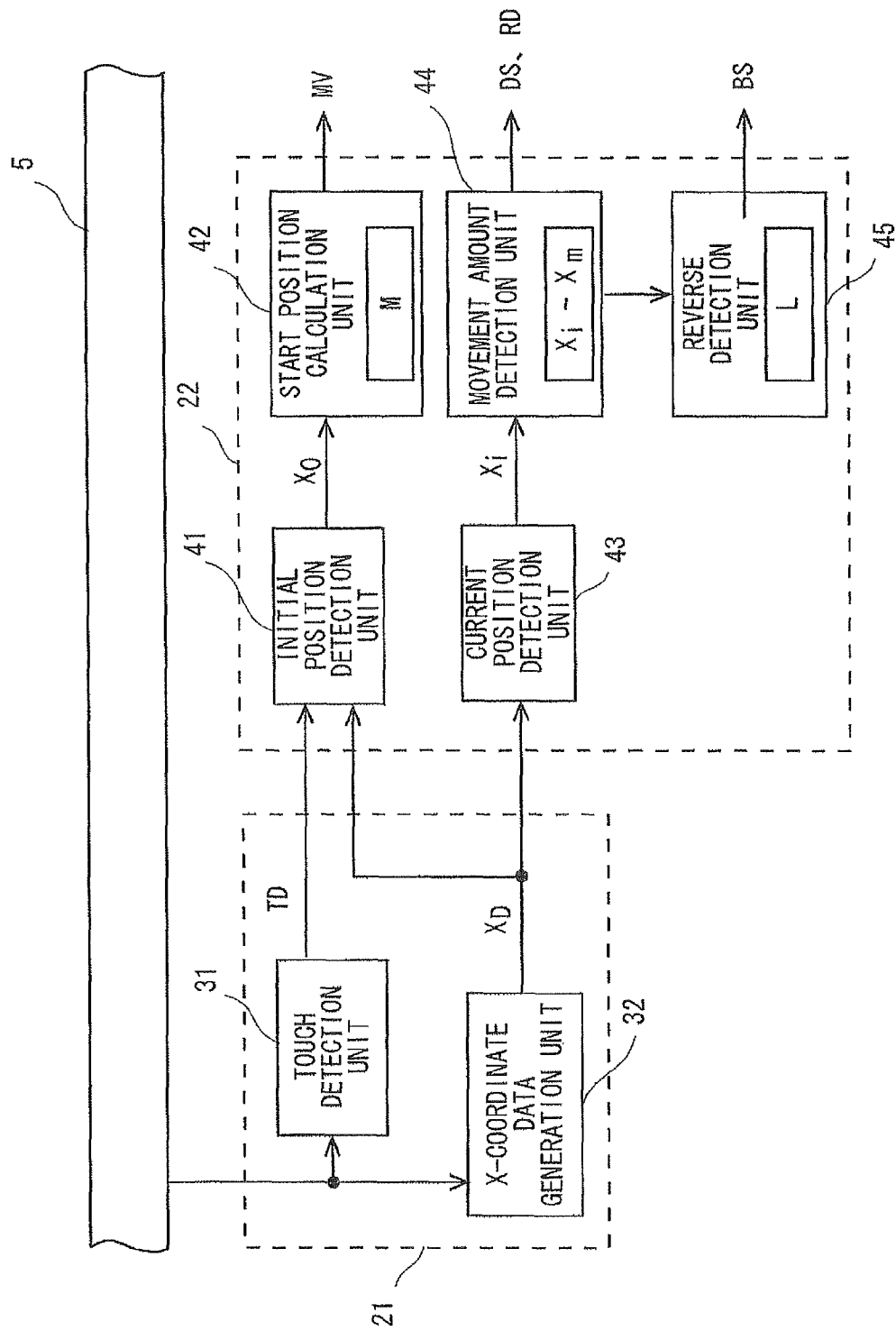
FIG. 5 shows a configuration of coordinate detection means and movement detection means shown in FIG. 4.

As shown in FIG. 5, the coordinate detection means 21 includes a touch detection unit 31 that detects whether or not a finger 6 is placed on the touch panel 5 according to the output of the touch panel 5 and outputs a touch detection signal TD, and an X-coordinate data generation unit 32 that performs an A/D conversion for an X-coordinate signal output from the touch panel 5 (signal indicating an area in the X-coordinate direction of the area of the touch panel 5 at which the finger 6 is pressed) and thereby generates X-coordinate data $X_D$.

Further, the movement detection means 22 includes an initial position detection unit 41, a start position calculation unit 42, a current position detection unit 43, a movement amount detection unit 44, and a reverse detection unit 45.

The initial position detection unit 41 detects a position at which the finger 6 initially presses the touch panel 5 (position at which the subject person initially places his/her finger 6) based on the touch detection signal TD of the touch detection unit 31 and the X-coordinate data $X_D$ of the X-coordinate data generation unit 32, and outputs initial position data $X_0$ indicating the X-coordinate of the detected position.

Figure 6:
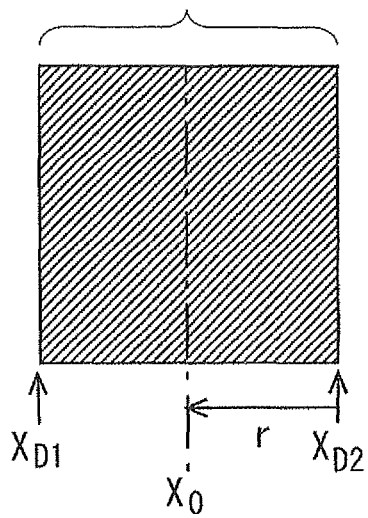
FIG. 6 shows a press position detection method.

Note that as shown in FIG. 6, the pressed range of the finger 6 in the sub-scanning direction (X-coordinate direction) is much larger than the width of one scale division of the X-coordinate of the touch panel 5. Therefore, the X-coordinate data $X_D$, which is supplied from the X-coordinate data generation unit 32 to the initial position detection unit 41, is a value corresponding to a plurality of scale divisions from X-coordinate data $X_{D1}$ at the left end to X-coordinate data $X_{D2}$ at the right end. In the initial position detection unit 41, the coordinate value is corrected by subtracting a predetermined amount r in the direction heading from the X-coordinate data $X_{D2}$ toward the inner side of the finger 6 or adding a predetermined amount r in the direction heading from the X-coordinate data $X_{D1}$ toward the inner side of the finger 6. Then, this corrected value is defined as "press position" of the finger 6 and used as the initial position data $X_0$.

Note that the above-described correcting function does not necessarily have to be disposed in the initial position detection unit 41. That is, the correcting function may be disposed in the X-coordinate data generation unit 32 of the coordinate detection means 21. Further, when the coordinate information is narrowed to one point in advance and output as the one point data because of the specifications of the touch panel 5 (for example, when the middle value between the X-coordinate at the left end of the pressed area and the X-coordinate at the right end is output), the above-described coordinate correction process is unnecessary.

Figure 7:
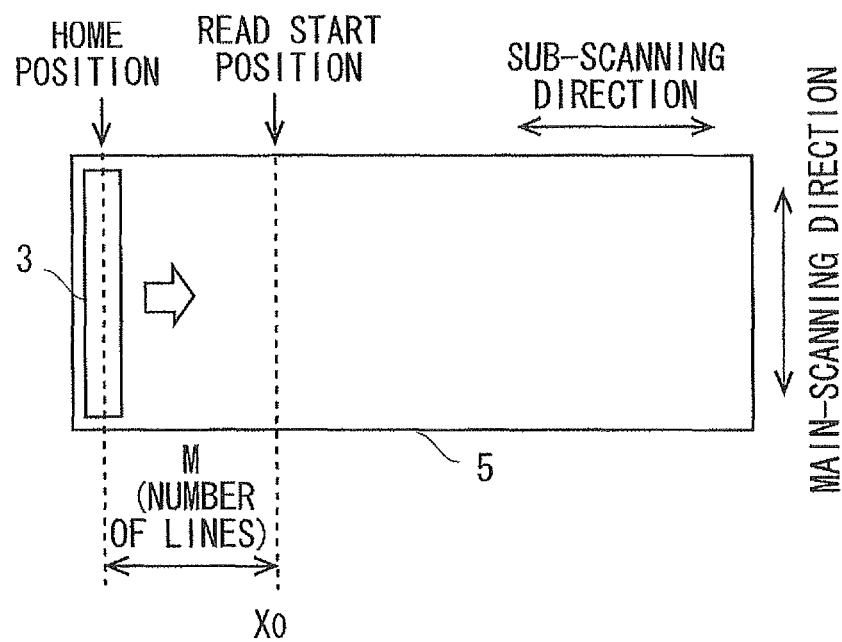
FIG. 7 shows a method of calculating a movement amount to a read start position.

As shown in FIG. 7, the start position calculation unit 42 calculates a movement amount M from the home position of the read unit 3 to the read start position based on the initial position data $X_0$ of the initial position detection unit 41, and outputs an initial drive value MV indicating the movement amount. In the start position calculation unit 42, information about how many scale divisions of the X-coordinate of the touch panel 5 the line width LW of the CCD 12 corresponds is stored in advance.

The current position detection unit 43 outputs current position X-coordinate data $X_i$ indicating the current press position of the finger 6 based on the X-coordinate data $X_D$ of the X-coordinate data generation unit 32. Similarly to the case of the initial position detection unit 41 shown in FIG. 6, in the current position detection unit 43, the coordinate value is corrected by subtracting a predetermined amount r in the direction heading from the X-coordinate data $X_{D1}$ or $X_{D2}$ toward the inner side of the finger 6. Then, this corrected value is defined as "press position" of the finger 6 and used as the current position X-coordinate data $X_i$. Note that the detection cycle of the current position X-coordinate data $X_i$ is a constant cycle, and is set to a cycle shorter than the image signal output cycle VT of the CCD 12 (see FIG. 9).

The movement amount detection unit 44 determines whether or not the movement amount of the press position of the finger 6 has reached the line width LW of the CCD 12 (see FIG. 3) based on the current position X-coordinate data $X_i$ of the current position detection unit 43, and outputs a movement detection signal DS.

Figure 8:
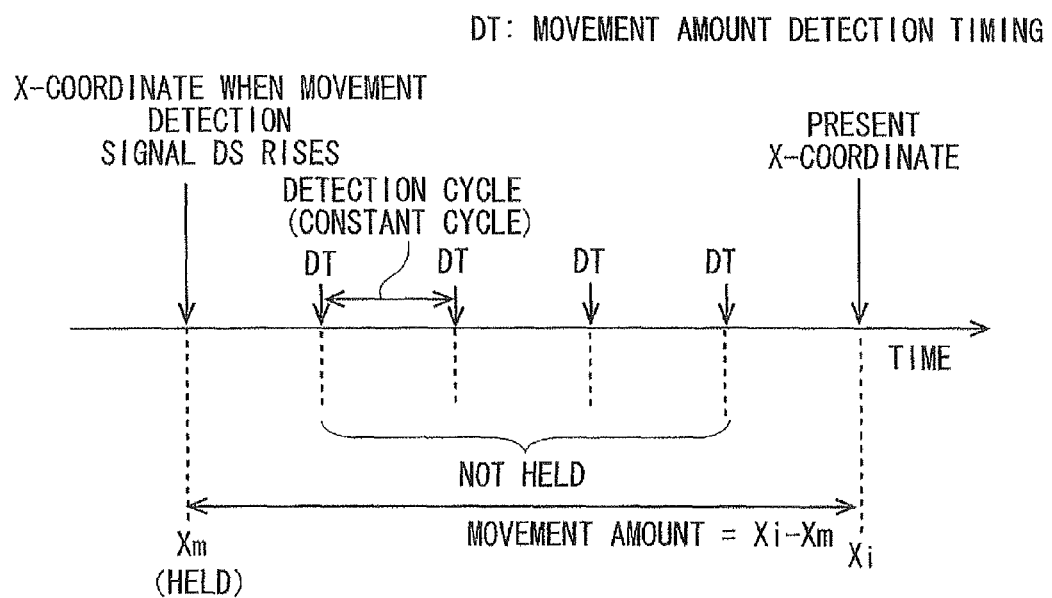
FIG. 8 shows a method of detecting a finger movement amount.
Figure 9:
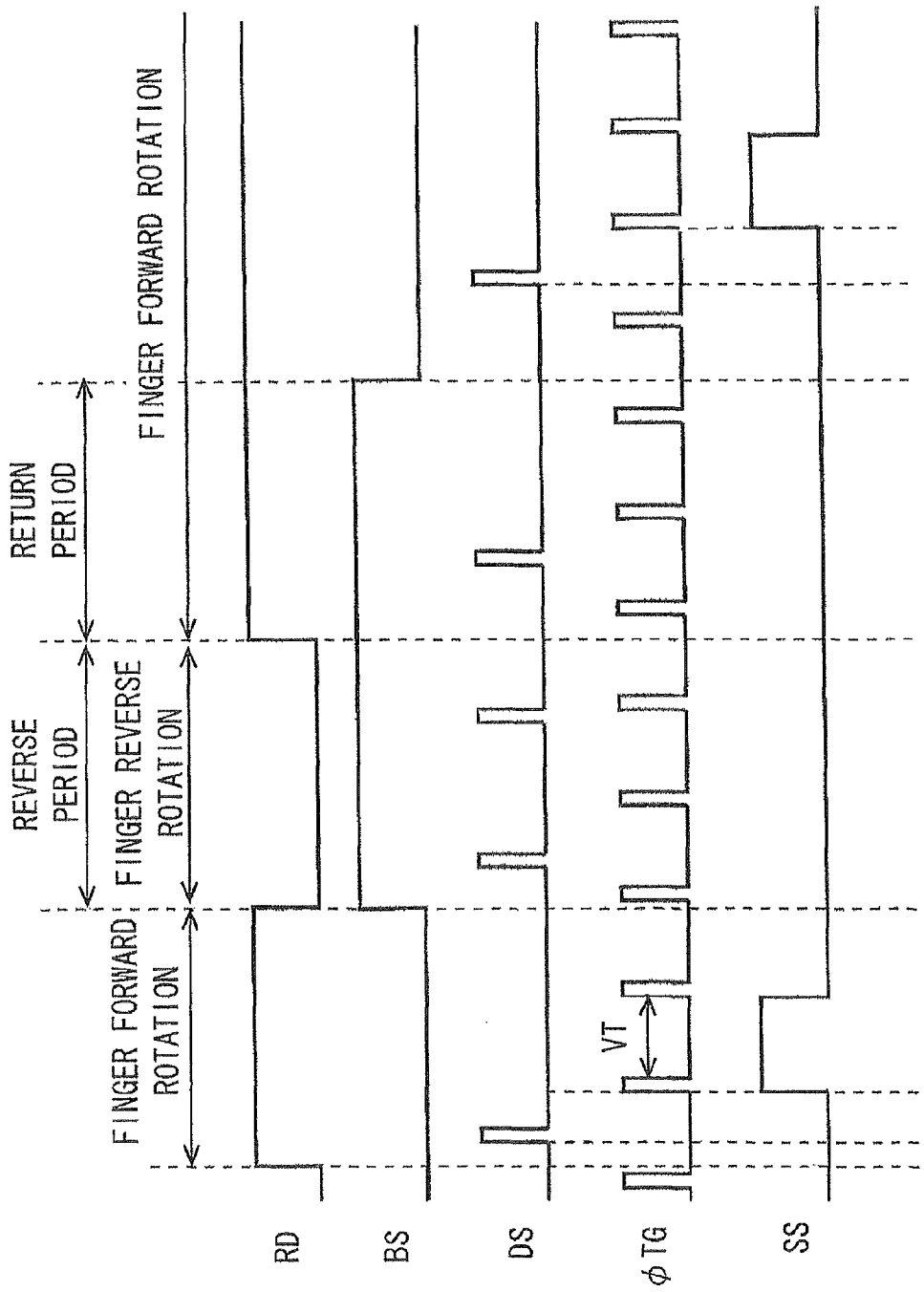
FIG. 9 is a timing chart showing a method of sorting out validation/invalidation of image data.

As shown in FIG. 8, the movement amount detection unit 44 holds X-coordinate data $X_m$ at the moment when the later-described movement detection signal DS is raised, and calculates a movement amount $(X_i-X_m)$ of the finger 6 by subtracting the held X-coordinate data $X_m$ from the present current position X-coordinate data $X_i$. Then, the movement amount detection unit 44 determines whether or not the calculated movement amount $(X_i-X_m)$ has reached the length equivalent to the line width LW of the CCD 12. If it has reached, the movement detection signal DS is raised to a Hi-level as shown in FIG. 9. Note that in the movement amount detection unit 44, information about how many scale divisions of the X-coordinate of the touch panel 5 the line width LW of the CCD 12 corresponds is also stored in advance.

Further, the movement amount detection unit 44 determines the movement direction of the finger 6 (whether it is the forward rotation or the reverse rotation in the sub-scanning direction), and outputs a direction signal RD indicating the movement direction. This direction signal RD becomes a Hi-level when the movement direction of the finger 6 is the forward rotation direction, and become a Low-level when the movement direction of the finger 6 is the reverse rotation direction. The decision on the movement direction of the finger 6 can be made by using the above-described calculated movement amount $(X_i-X_m)$. When the movement amount $(X_i-X_m)$ has a positive value, the movement direction is determined to be the forward rotation, whereas when it has a negative value, the movement direction is determined to be the reverse rotation.

The reverse detection unit 45 is provided in order to control an operation performed when the movement direction of the finger 6 is reversed. The reverse detection unit 45 controls a value L indicating the reverse movement amount of the finger 6 (value obtained by expressing the movement amount in the reverse direction by the number of lines) based on the direction signal RD and the movement amount $(X_i-X_m)$ of the movement amount detection unit 44, and generates a reverse return signal BS based on this reverse movement amount L.

The reverse return signal BS is a signal that indicates a period in which the finger 6 is moving in the reverse direction (reverse period) and a period in which the finger 6 is reversed again from the reverse-direction movement state and is returning to the reverse start position (position at which the rotation movement direction of the finger 6 changed from the forward rotation to the reverse rotation) (return period). Therefore, as shown in FIG. 9, the reverse return signal BS is at a Hi-level in a period from when the finger 6 starts the reverse action from the forward rotation to the reverse rotation and to when the finger 6 has returned to the original position.

Figure 10:
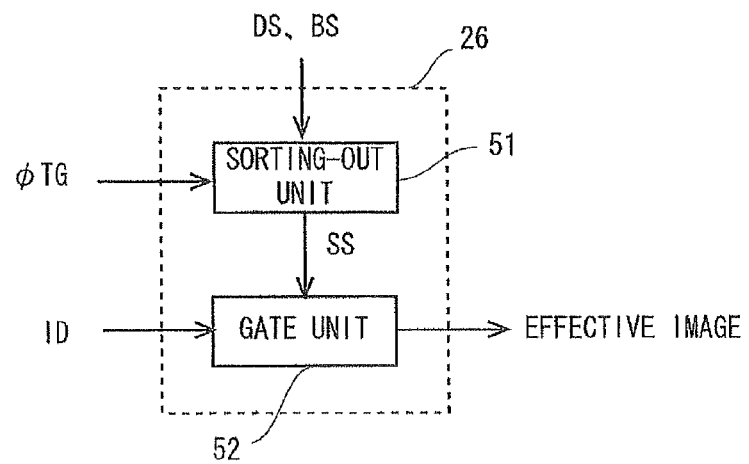
FIG. 10 shows a configuration of image sorting-out means.

Referring to FIG. 4 again, the image sorting-out means 26 includes, as shown in FIG. 10, a sorting-out unit 51 that receives the movement detection signal DS and the reverse return signal BS supplied from the movement detection means 22 and the image output signal φTG supplied from the CCD driver 23 and outputs an image select signal SS, and a gate unit 52 that sorts out image data ID into effective image data and non-effective image data based on the image select signal SS of the sorting-out unit 51.

As shown in FIG. 9, the sorting-out unit 51 refers to the movement detection signal DS and the image output signal φTG during the period in which the reverse return signal BS is at a Low-level. Then, the sorting-out unit 51 raises the image select signal SS to a Hi-level in response to a rise of the image output signal φTG that occurs immediately after the movement detection signal DS rises to a Hi-level, and holds the raised image select signal SS over the period equivalent to one cycle of the image signal output cycle VT of the CCD 12. Note that the Hi-level period of the image select signal SS corresponds to the period during which the image data ID becomes an effective image(s), and the Low-level period of the image select signal SS corresponds to the period during which the image data ID becomes an ineffective image(s).

Meanwhile, during the period in which the reverse return signal BS is a Hi-level, the image select signal SS is kept at a Low-level regardless of the movement detection signal DS and the image output signal φTG.

The gate unit 52 outputs the image data ID output from the image signal processing unit 25 as an effective image(s) to the subsequent memory 27 during the period in which the image select signal SS is at a Hi-level. Further, the gate unit 52 regards the image data ID as an ineffective image(s) and thereby discards the image data ID during the period in which the image select signal SS is at a Low-level. Note that the gate unit 52 can be formed by, for example, an AND circuit.

Figure 11:
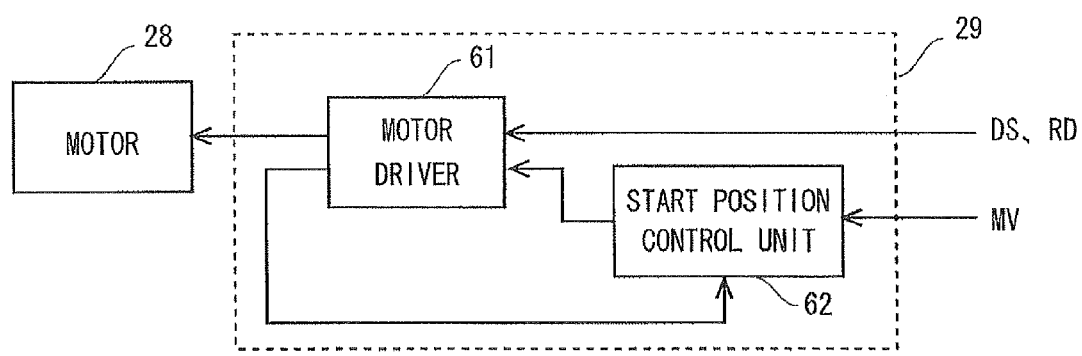
FIG. 11 shows a configuration of motor control means.

Referring to FIG. 3 again, the motor control means 29 includes, as shown in FIG. 11, a motor driver 61 that drives the motor 28 in response to the movement detection signal DS supplied from the movement detection means 22, and a start position control unit 62 that controls the movement of the CCD 12 (read unit 3) to the read start position.

When the movement detection signal DS of the movement amount detection unit 44 rises to a Hi-level, the motor driver 61 drives the motor 28 and thereby moves the CCD 12 (read unit 3) a distance equivalent to the line width LW in the sub-scanning direction. Further, when the direction signal RD of the movement amount detection unit 44 indicates the forward direction, the motor driver 61 rotates the motor 28 in the forward direction (rotation direction for moving the CCD 12 in the forward direction), whereas when the direction signal RD indicates the reverse direction, the motor driver 61 rotates the motor 28 in the reverse direction.

The start position control unit 62 is used when the CCD 12 is moved from the home position to the read start position (see FIG. 7). The start position control unit 62 compares the initial drive value MV supplied from the movement detection means 22 (see FIG. 5) with the motor drive amount (number of lines the CCD 12 has moved), and instructs the motor driver 61 so that the motor 28 is driven until these values become equal to each other.

Note that the above-described configuration explained with reference to FIGS. 4 to 11 do not necessarily have to be constructed entirely by hardware. That is, needless to say, part of the configuration may be configured by software.

Next, an operation of the image reading apparatus 1 having the above-described configuration is explained. Firstly, an operation procedure for a fingerprint reading operation is explained hereinafter by referring mainly to FIGS. 12 to 15.

Figure 12A:
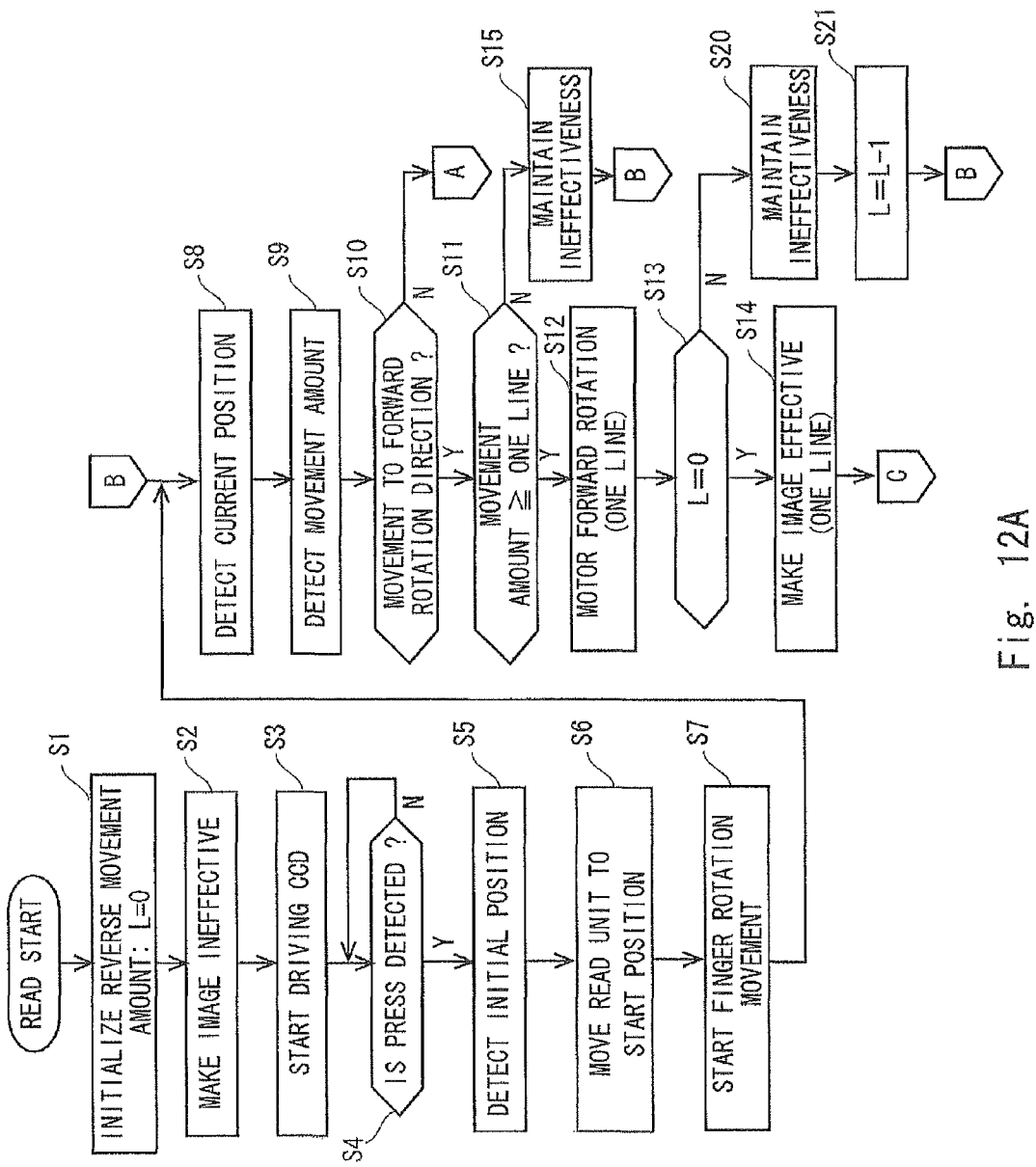
FIG. 12A is a main flowchart showing an operation procedure of an image reading apparatus.

As shown in FIG. 12A, when an external read command is received, firstly, the reverse movement amount (number of lines) L is initialized as "L=0" in the reverse detection unit 45 (see FIG. 5) (step S1). Further, in the sorting-out unit 51 (see FIG. 10), the image select signal SS is lowered to a Low-level and the ineffective setting of the image data ID is thereby performed (step S2).

Next, the CCD 12 starts to be driven (step S3), and it waits for a finger 6 to be placed on the touch panel 5 (step S4). Then, when a finger 6 is placed on the touch panel 5 and the touch detection unit 31 (see FIG. 5) detects the placement of the finger 6, the initial position detection unit 41 responds to this detection and generates initial position data $X_0$ indicating the initial position of the finger 6 (step S5).

Next, the start position calculation unit 42 (see FIG. 5) calculates a movement amount M of the read unit 3 from the home position to the read start position (see FIG. 7), and the start position control unit 62 (see FIG. 11) moves the read unit 3 to the read start position (step S6).

Figure 13A:
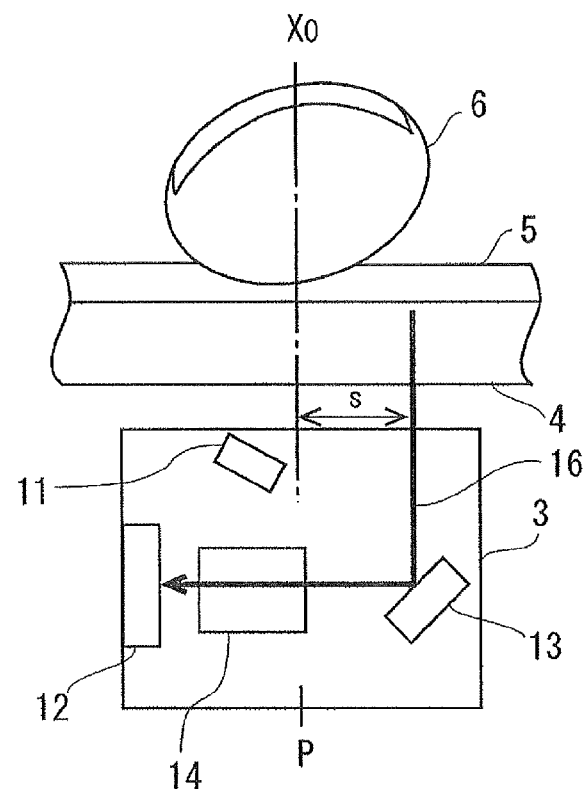
FIG. 13A shows a position correction of a read unit, and shows a state before a correction.

Note that as shown in FIG. 13A, for example, in the case where the position control of the read unit 3 is performed by using the center of the read unit 3 as the reference position P, though depending on the arrangement positions of the mirror 13 and the optical lens 14, when the read unit 3 is moved from the home position to the read start position, the read unit 3 may be positioned in such a state that there is a deviation between the optical axis 16 of the mirror 13 and the optical lens 14 and the initial position $X_0$ of the finger 6.

Figure 13B:
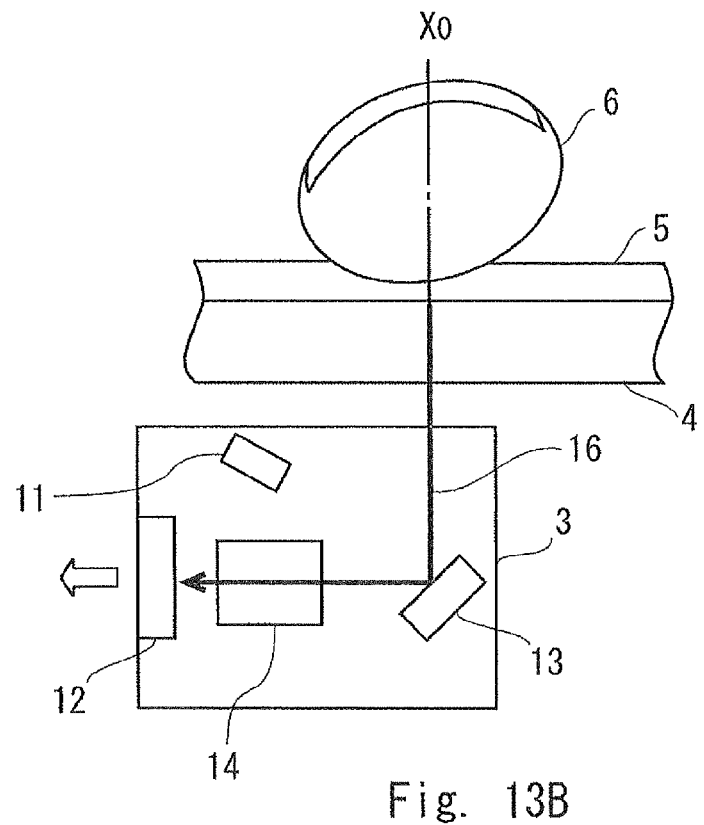
FIG. 13B shows a position correction of a read unit, and shows a state after a correction.

In the case like this, as shown in FIG. 13B, the position of the read unit 3 may be corrected by, after the read unit 3 is moved to the read start position, moving the read unit 3 in the reverse direction by a minuscule amount equivalent to the deviation s between the optical axis 16 and the press position $X_0$. Alternatively, after the movement amount M shown in FIG. 7 is obtained, the deviation s may be subtracted from the movement amount M (M−s) and the initial drive value MV may be determined based on this subtracted value.

However, when a configuration in which no deviation occurs in the first place is used, such as when the reference position P of the read unit is set so as to coincide with the optical axis 16, the above-described correction process is unnecessary.

Referring to FIG. 12A again, when the subject person starts a rotational movement of his/her finger 6 (step S7), the current position detection unit 43 (see FIG. 5) generates current position X-coordinate data $X_i$ indicating the current press position of the finger 6 (step 8). Note that as described previously, the detection cycle of the current position X-coordinate data $X_i$ is a constant cycle, and is set to a cycle shorter than the image signal output cycle VT of the CCD 12 (output cycle of image signal IS) (see FIG. 9).

Next, the movement amount detection unit 44 (see FIG. 5) calculates the movement amount $(X_i - X_m)$ of the finger 6 and generates a direction signal RD indicating the movement direction of the finger 6 (step S9). Next, it is determined whether or not the movement direction of the finger 6 is the forward rotation direction (step S 10). When it is the forward rotation (step S10: Y), it is determined whether or not the movement amount ($X_i-X_m$) of the finger 6 has reached the line width LW of the CCD 12 (see FIG. 3) (step S11).

Then, when the movement amount ($X_i-X_m$) of the finger 6 is equal to or greater than the line width LW (when the movement detection signal DS rises to a Hi-level) (step S11: Y), it indicates that the press position of the finger 6 has moved a distance equal to or greater than the line width LW in the forward rotation direction.

Figure 15A:
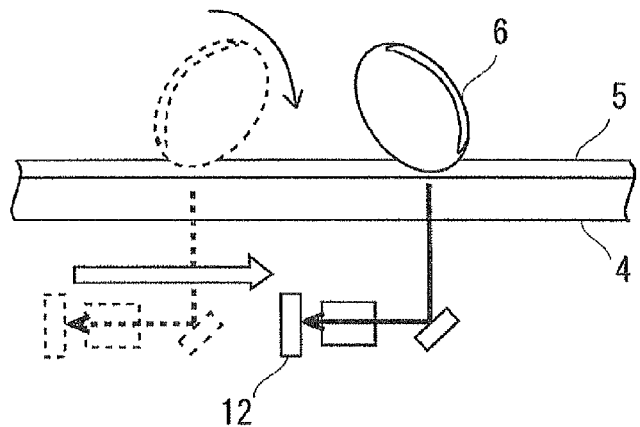
FIG. 15A shows a relation between a rotational movement of a finger and a movement of a CCD.

Therefore, the motor driver 61 (see FIG. 11) drives the motor 28 and thereby moves the CCD 12 (read unit 3) a distance equivalent to the line width LW in the forward rotation direction (step S12). As a result, as shown in FIG. 15A, the CCD 12 is moved in the forward direction by one line at a time while making the CCD 12 follow the movement of the finger 6.

Note that in FIG. 12A, a step S13 is performed after the step S12. However, the explanation of the step S13 is omitted here for the sake of convenience. The step S13 will be explained later.

In parallel with the process in the step S12, the sorting-out unit 51 raises the image select signal SS to a Hi-level and the image data ID output from the image signal processing unit 25 is thereby made effective (step S14). As described previously, the rise of the image select signal SS is performed in response to the rise of the image output signal φTG that occurs immediately after the movement detection signal DS rises to a Hi-level. Further, the Hi-level period of the image select signal SS is kept over a period equivalent to one cycle of the image signal output cycle VT of the CCD 12 (see FIG. 9). As a result, the image data ID corresponding to one line is made effective, and the effective image data ID is output to the memory 27 through the gate unit 52 (see FIG. 10).

On the other hand, when the movement amount ($X_i-X_m$) of the finger 6 is smaller than the line width LW (when the movement detection signal DS has not risen to a Hi-level) (step S11: N), the state where the image data ID is ineffective (state where the image select signal SS is at a Low-level) is maintained in the sorting-out unit 51 (step S15).

In contrast to these states, when the movement direction of the finger 6 is the reverse rotation direction (step S10: N), as shown in FIG. 12C, the state where the image data ID is ineffective is maintained in the sorting-out unit 51 (step S16) and it is determined whether or not the absolute value of the movement amount ($X_i-X_m$) of the finger 6 is equal to or greater than the line width LW (step S17).

When the absolute value of the movement amount ($X_i-X_m$) of the finger 6 is smaller than the line width LW (step S17: N), the procedure moves to the step S8. Then, in response to the arrival of the next detection timing of the current position X-coordinate data $X_i$, the processes at the step S8 and the subsequent steps are performed.

On the other hand, when the absolute value of the movement amount ($X_i-X_m$) of the finger 6 is equal to or greater than the line width LW (step S17: Y), it indicates that the press position of the finger 6 has moved a distance equal to or greater than the line width LW in the reverse rotation direction. Therefore, the reverse detection unit 45 adds one line to the reverse movement amount L (step S18). Further, the motor 28 is rotated in the reverse direction and the CCD 12 is thereby moved a distance equivalent to the line width LW in the reverse rotation direction (step S19).

Figure 15B:
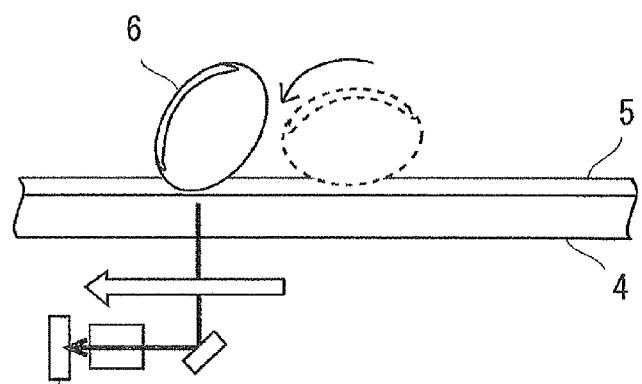
FIG. 15B shows a relation between a rotational movement of a finger and a movement of a CCD.

After that, in response to the arrival of the next detection timing of the current position X-coordinate data $X_i$, the process in the step S8 is performed. Then, in the step S10, it is determined whether or not the movement direction of the finger 6 is the forward rotation direction. At this point, when the finger 6 is still moving to the reverse direction (step S10: N), the procedure moves to the process in the step S16 again and the processes in the steps S16 to S19 are repeated. Therefore, every time the absolute value of the movement amount ($X_i-X_m$) becomes equal to or greater than the line width LW, a value "1" is cumulatively added to the reverse movement amount L and the CCD 12 is moved in the reverse direction by one line at a time so as to follow the movement of the finger 6 as shown in FIG. 15B.

On the other hand, when the movement direction of the finger 6 has changed to the forward rotation direction in the process in the step S10 (step S10: Y), the procedure moves to the process in the step S11 and it is determined whether or not the movement amount ($X_i-X_m$) of the finger 6 is equal to or greater than the line width LW. Then, when the movement amount of the finger 6 to the forward rotation direction (movement amount to the direction for returning to the reverse start position) is equal to or greater than the line width LW (step S11: Y), the motor 28 is rotated in the forward direction and the CCD 12 is retuned in the forward rotation direction by a distance equivalent to one line (step S12).

Next, it is determined whether or not the reverse movement amount L of the reverse detection unit 45 is "0" (step S13). This process is performed to check whether the CCD 12 has returned to the reverse start position of the finger 6. When the reverse movement amount L is not "0" (step S13: N), i.e., when the CCD 12 has not returned to the reverse start position, a value "1" is subtracted from the reverse movement amount L held in the reverse detection unit 45 (step S21) while maintaining the ineffectiveness of the image data ID (step S20). Note that the subtraction of "1" from the reverse movement amount L corresponds to the process in which the CCD 12 has returned in the forward rotation direction by a distance equivalent to one line in the step S12.

Figure 15C:
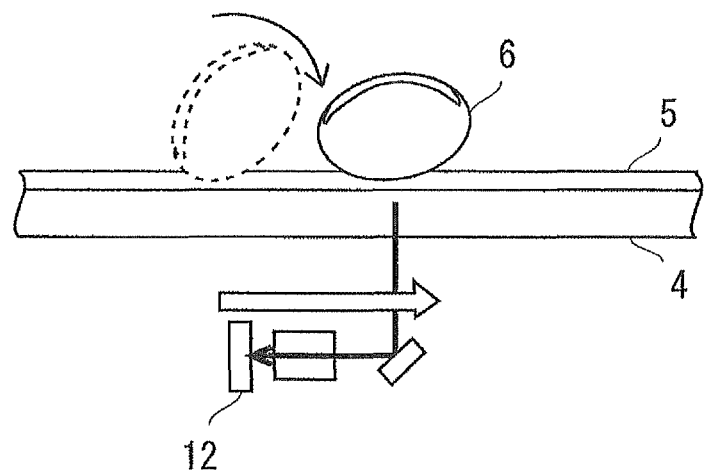
FIG. 15C shows a relation between a rotational movement of a finger and a movement of a CCD.

After that, the above-described processes are repeated until the reverse movement amount L becomes "0". As shown in FIG. 15C, the CCD 12 is moved to the forward rotation direction by one line at a time while making the CCD 12 follow the movement of the finger 6 which is returning to the reverse start position. Then, when the reverse movement amount L is "0", i.e., when the CCD 12 has returned to the reverse start position of the finger 6 (step S13: Y), the procedure moves to the process in the step S14. Then, similarly to the above-described processes, the CCD 12 is intermittently moved one line at a time in the forward direction while making the image data ID effective as appropriate.

Figure 12B:
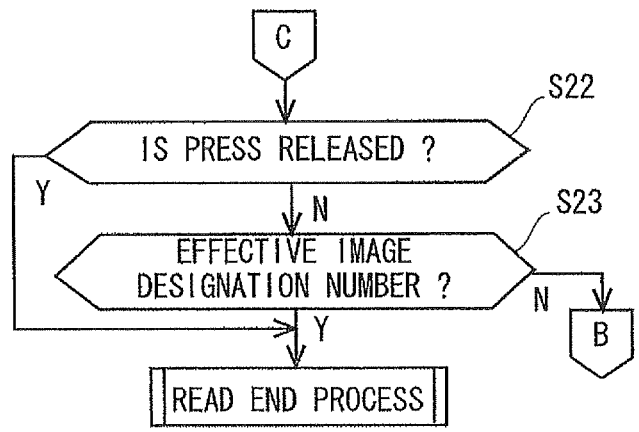
FIG. 12B is a main flowchart showing an operation procedure of an image reading apparatus.
Figure 12C:
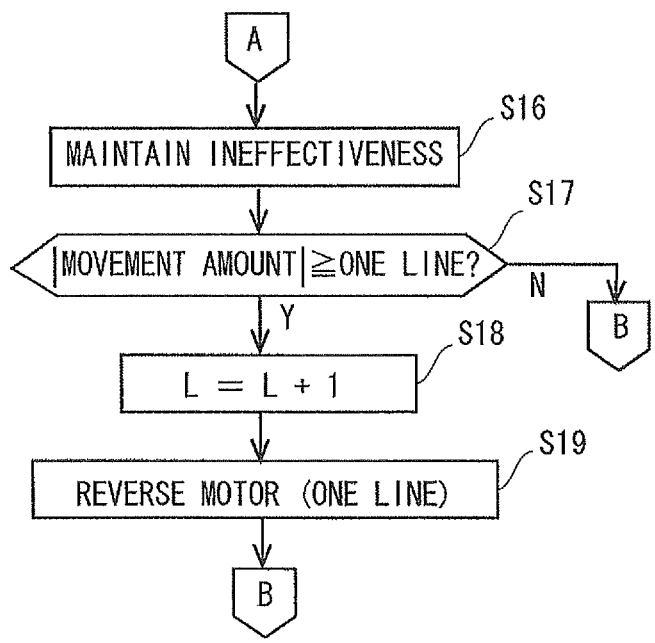
FIG. 12C is a main flowchart showing an operation procedure of an image reading apparatus.

After that, as shown in FIG. 12B, until the finger 6 is detached from the touch panel 5 or the number of obtained lines of the image data ID has reached to an effective image designation line number (steps S22 and S23), the processes in the steps S8 to S20 are repeated and a rotational fingerprint image from one side to the other side of the finger 6 is thereby obtained on a line-by-line basis. Note that the effective image designation line number is a value that is defined in advance by estimating the general size of rotational fingerprint images of all people and is a value obtained by expressing the estimated size of rotational fingerprint images by the number of lines of the CCD 12.

Figure 14:
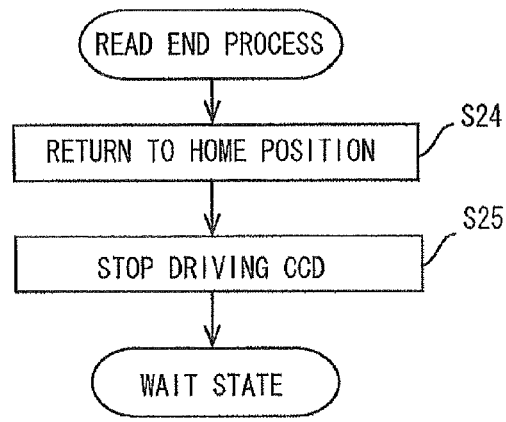
FIG. 14 is a sub flowchart showing an operation procedure of a read end process.

Then, when the finger 6 is detached from the touch panel 5 or the number of obtained lines of the image data ID has reached to the effective image designation line number (step S22: Y, or step S23: Y), the reading operation is terminated. Therefore, as shown in FIG. 14, the CCD 12 is returned to the home position and the driving of the CCD 12 is stopped (steps S24 and S25).

Next, an example of an operation of the image reading apparatus 1 performed under the procedure shown in FIGS. 12 to 15 is explained. In this example, firstly, a case where a finger 6 placed on the touch panel 5 is rotationally moved only in the forward rotation direction is explained by referring mainly to FIG. 16. Note that although it is not illustrated in FIG. 16, the reverse return signal BS is kept at a Low-level.

At the beginning, when the rotational-movement speed of the finger 6 is low, after the movement detection signal DS rises at a timing $t_1$, the state where the movement detection signal DS remains at the Low-level continues for some time. In this case, firstly, the image select signal SS rises in response to the rise of the image output signal ϕTG (timing $t_2$) that occurs immediately after the movement detection signal DS rises. Therefore, the image data ID(A) is made effective. Further, in response to the rise of the movement detection signal DS (timing $t_1$), the motor drive signal rises and the CCD 12 is thereby moved a distance equivalent to one line in the forward rotation direction.

Then, when the image signal output cycle VT of the CCD 12 has elapsed (i.e., in response to the next rise of the image output signal ϕTG), the image select signal SS falls and the state changes so that the image data ID is made ineffective (timing $t_3$). After that, the ineffectiveness of the image data ID is continued until the next rise of the image select signal SS (timing $t_5$), so that both of the image data ID(B) and ID(C), which are output during that period, are discarded.

At a timing $t_4$, when the movement detection signal DS rises for the second time, the image data ID(D) is made effective and the motor is driven as in the case of the above-described processes. At this point, if the rotational-movement speed of the finger 6 has changed and become higher, the movement detection signal DS rises at shorter intervals after the timing $t_4$. In response to this, the frequency at which the image data ID is made effective increases. Therefore, the image data ID(E), which is the next data of the image data ID(D), is also made effective.

After that, the image data ID is sorted out into effective data or ineffective data according to the degree of the advancement of the finger 6 (timings $t_6$ to $t_{11}$). Further, the CCD 12 is intermittently moved to the forward direction as appropriate and the reading operation is thereby advanced. Then, when the reading operation has been finished, one fingerprint image is obtained by joining the effective image data (image data stored in the memory 27) ID(A), ID(D), ID(E), ID(G)-ID(I), ID(K)-ID(M), and ID(O) together. Note that the joining operation of the image data ID does not require any sophisticated data-editing process such as the so-called image synthesis processing. That is, the joining operation may be performed just by reading out the image data ID written into the memory 27 according to the writing order of the image data ID.

As described above, this exemplary embodiment is configured in such a manner that the movement amount of the press position of the finger 6 is detected and the CCD 12 is moved so as to follow the rotational movement of the finger 6 while making the CCD 12 output the image signal IS for each line at regular intervals. In addition, every time the movement amount of the press position of the finger 6 reaches the line width LW, the image data. ID is selectively made effective. As a result, it is possible to obtain a fingerprint image on a line-by-line basis in an orderly manner while preventing overlaps between fingerprint images (overlaps between images). Further, the entire image of a rotational fingerprint is generated by joining together a plurality of line-by-line image data ID, which are obtained in the above-described manner. As a result, distortions are less likely to occur at the joints between images in comparison to the case where frame images (area images) are combined. Therefore, it is possible to obtain an excellent image with no or small distortion without using any distortion correction processing like the one used in the conventional technique.

Figure 17:
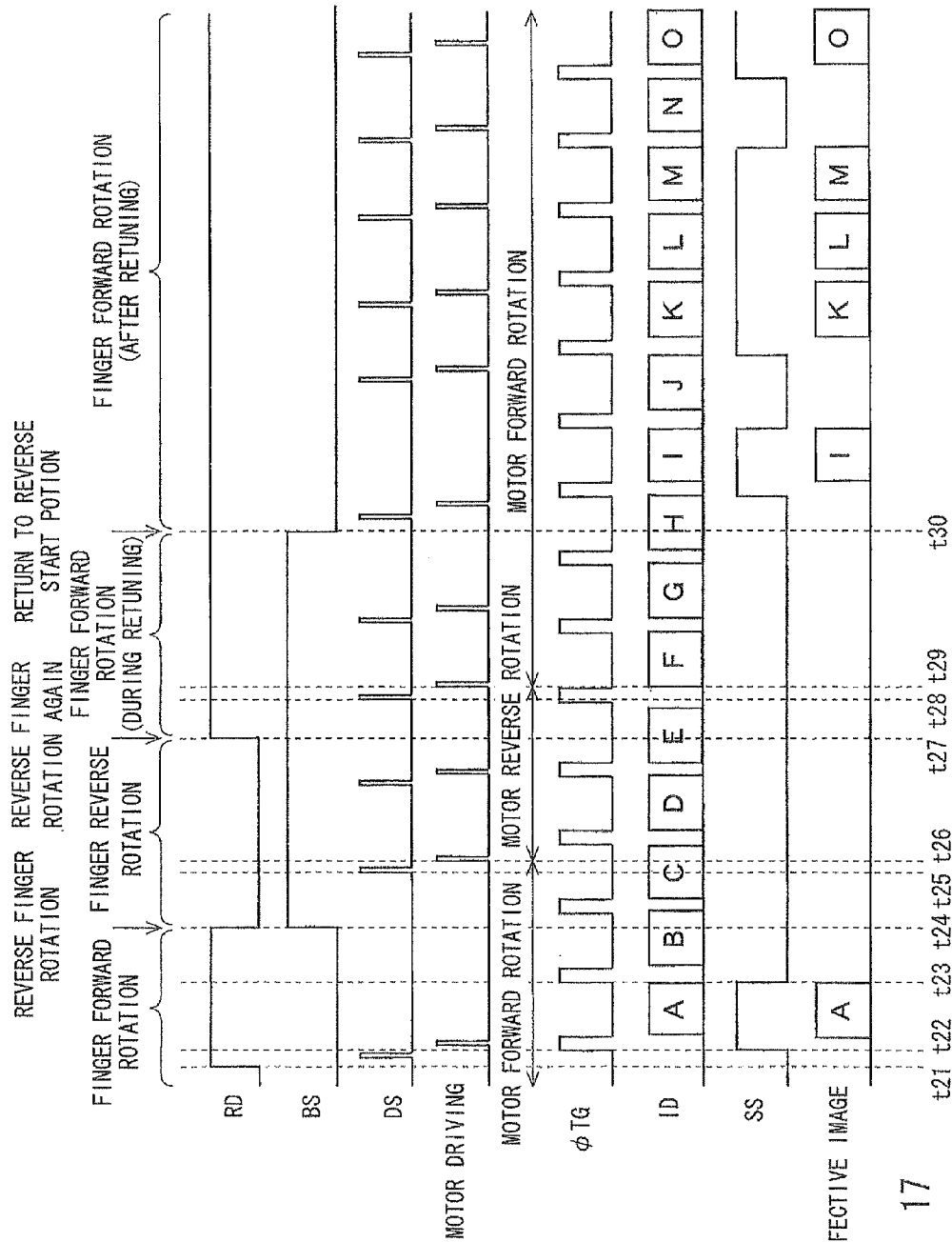
FIG. 17 is a timing chart showing an operation of an image reading apparatus, and shows an operation in a case where the rotation movement direction of a finger placed on a touch panel is reversed.

Next, a case where the rotational movement direction of a finger 6 placed on the touch panel 5 is reversed is explained by referring mainly to FIG. 17.

At timings $t_{21}$ to $t_{24}$ in which the finger 6 is rotationally moved in the forward direction, the direction signal RD rises to a Hi-level.

Figure 16:
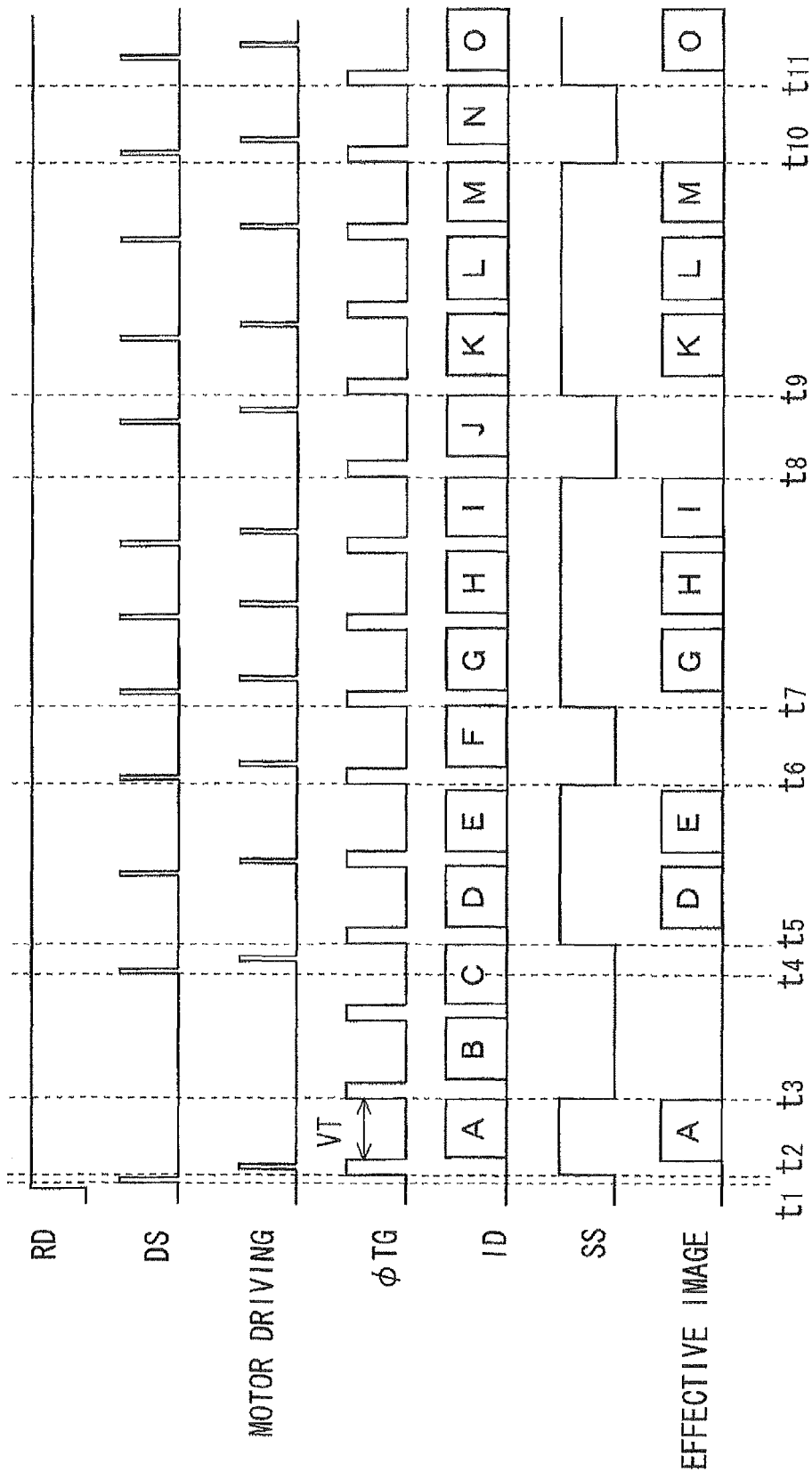
FIG. 16 is a timing chart showing an operation of an image reading apparatus, and shows an operation in a case where a finger placed on a touch panel is rotationally moved only in a forward rotation direction.

Therefore, the apparatus operates in a similar manner to that in the timings $t_1$ to $t_3$ shown in FIG. 16.

Then, at a timing $t_{24}$, when the rotational movement direction of the finger 6 is reversed and the press position of the finger 6 starts to move in the reverse direction, the reverse return signal BS rises to a Hi-level. The reverse return signal BS is kept at the Hi-level until a timing $t_{30}$ at which the finger 6, after being reversed again, has returned to the reverse start position (position at which the rotation movement direction of the finger 6 changes from the forward rotation to the reverse rotation). Therefore, all the image data ID(C) to ID(H), which are output during the period from the timing $t_{24}$ to $t_{30}$, are made ineffective and thereby discarded.

Further, at a timing $t_{25}$, when the movement amount of the finger 6 to the reverse direction has reached the line width LW, the motor drive signal rises (timing $t_{26}$) and the motor 28 is thereby rotated in the reverse direction. Therefore, the CCD 12 is moved in the reverse direction.

After that, at a timing $t_{27}$, when the rotational movement direction of the finger 6 is reversed again and the press position of the finger 6 starts to move in the forward direction, the direction signal RD rises to a Hi-level. Then, at a timing $t_{28}$, when the movement amount of the finger 6 to the forward direction has reached the line width LW, the motor drive signal rises (timing $t_{29}$) and the motor 28 is thereby rotated in the forward direction. Therefore, the CCD 12 is moved in the forward direction.

At and after a timing $t_{30}$ at which the finger 6 has returned to the reverse start position, the image data ID is sorted out into effective data or ineffective data according to the degree of the advancement of the finger 6 as in the case shown in FIG. 16. Further, the CCD 12 is moved in the forward direction as appropriate and the reading operation is thereby advanced.

As described above, this exemplary embodiment is configured in such a manner that a timing at which the rotational movement direction of the finger 6 is reversed and a timing at which the finger 6 is reversed again and returns to the reverse start position are detected and all the image data ID are made ineffective during that period. Therefore, it is possible to discard, as appropriate, image data ID that are obtained during the period in which the subject person has not rotationally moved his/her finger 6 in an appropriate manner. Therefore, the image data ID, which are obtained during that period, are not mixed into the joined image data ID, and thus making it possible to prevent the joined image from being disturbed. As a result, even when the subject person changes the rotational movement direction of his/her finger 6 halfway through the reading operation, the subject person is not forced to perform the reading operation again, and thus making it possible to improve the usability.

As described above, this exemplary embodiment is configured in such a manner that the CCD 12 having one-dimensional configuration (line sensor) is moved so as to follow the rotational movement of the finger 6 while reading a fingerprint image on a line-by-line basis by the CCD 12. Further, since the tracking-type scanner configuration is adopted for the read unit that generates an image signal of a fingerprint image, it is unnecessary to provide the apparatus with a structurally-large digital camera, and thus making it possible to reduce the overall size of the apparatus.

Further, as described above, it is configured in such a manner that every time the movement amount of the press position of the finger 6 reaches the line width LW, the image data ID is selectively made effective. Therefore, it is possible to obtain an excellent image with no or small distortion without using any distortion correction processing like the one used in the conventional technique. As a result, it is possible to solve the complicity of the circuit and software for signal processing and thereby to lower the price of the apparatus.

Although the exemplary embodiments according to the present invention are explained so far, the present invention is not limited to the above-described configurations. That is, various modifications can be made to those exemplary embodiments within the range of the present invention defined in the patent claims.

For example, although examples where an image reading apparatus according to the present invention is used to read a fingerprint are explained in the above-described exemplary embodiments, the object to be read (subject) is not limited to fingers but includes any object that can be rotationally moved on the touch panel 5. That is, the present invention can be widely applied to any objects which can be rotationally moved on the touch panel 5 and whose surface images can be thereby read. For example, the present invention can be applied to surface inspections or the like of canned drinks and/or canned foods. Note that it is preferable that the subject has a cylindrical shape. However, any objects that can be rotationally moved on the touch panel 5 can become the subject without causing any problem even when their shapes are somewhat distorted.

Figure 18A:
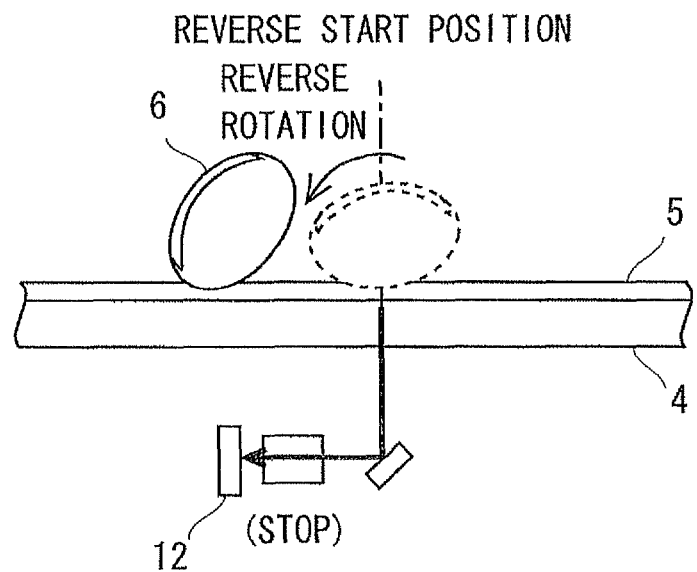
FIG. 18A shows a relation between a reversed rotational movement of a finger and a movement of a CCD.
Figure 18B:
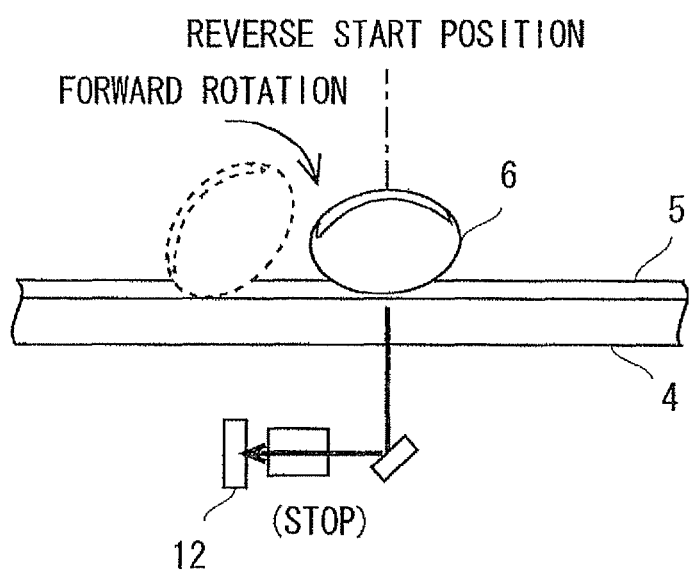
FIG. 18B shows a relation between a reversed rotational movement of a finger and a movement of a CCD.
Figure 18C:
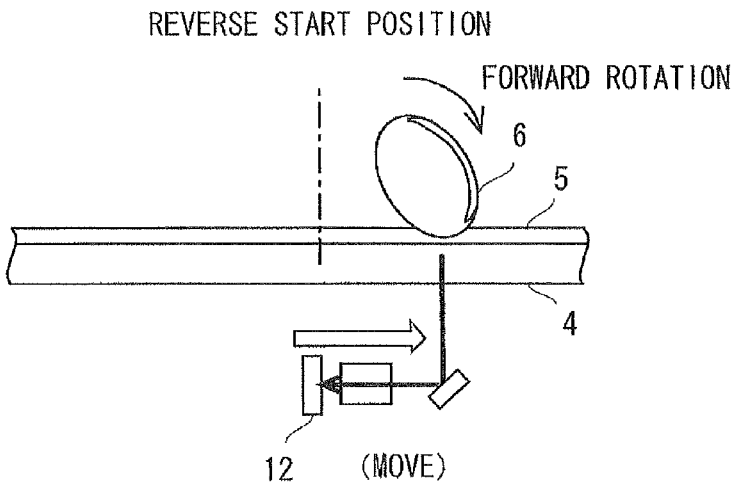
FIG. 18C shows a relation between a reversed rotational movement of a finger and a movement of a CCD.

Further, the above-described exemplary embodiments are configured so that when the rotational movement direction of the finger 6 is reversed, the CCD 12 is moved so as to follow its movement (see FIG. 15B). However, as shown in FIGS. 18A, 18B and 18C, they may be also configured in such a manner that: even when the finger 6 is rotationally moved in the reverse direction, the CCD 12 is stopped at the reverse start position of the finger 6 without being moved to the reverse direction; and after that, the CCD 12 waits there until the finger 6 is reversed again and has returned to the reverse start position. Note that after the finger 6 is returned to the reverse start position, the CCD 12 is moved to the forward direction so as to follow the movement of the press position of the finger 6 as in the case shown in FIG. 16.

Figure 19:
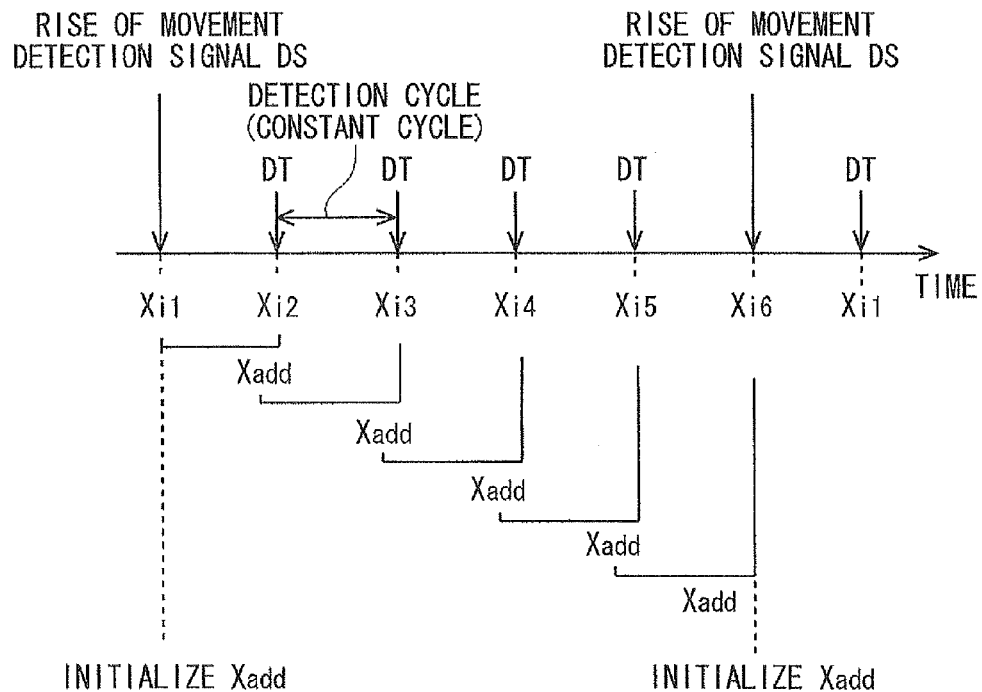
FIG. 19 shows another example of a method of determining whether or not a movement amount of a press position of a finger has reached a line width.
Figure 20:
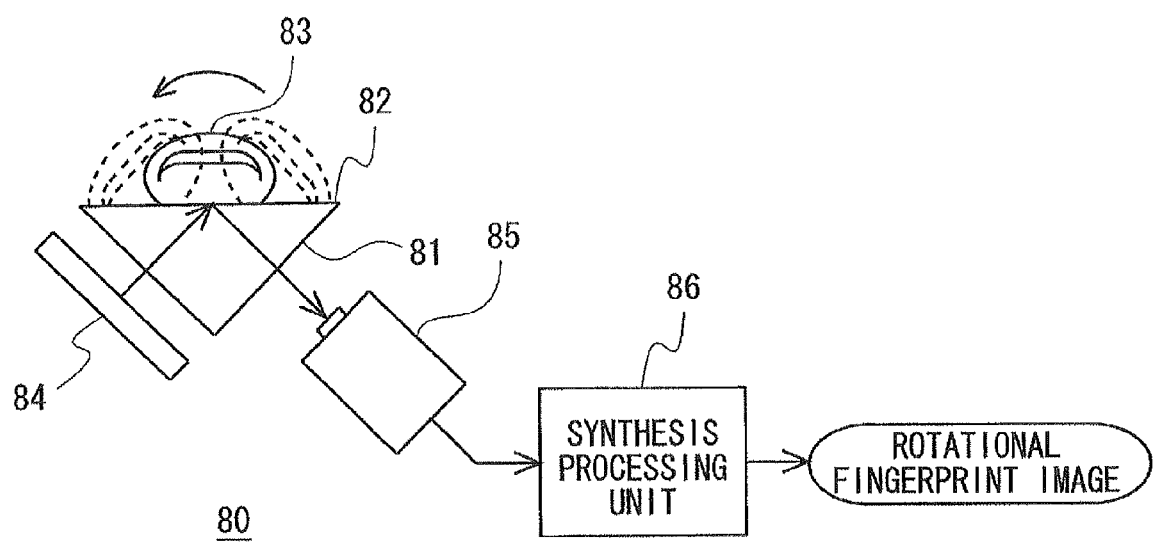
FIG. 20 shows an example of an image reading apparatus in a related art.

Further, the above-described exemplary embodiments are configured in such a manner that: when it is determined whether or not the movement amount of the press position of the finger 6 has reached the line width LW, the X-coordinate data $X_m$ at the moment when the movement detection signal DS is raised is held; this data is subtracted from the present current position X-coordinate data $X_i$ and the movement amount $(X_i - X_m)$ is thereby obtained; and it is determined whether or not the obtained movement amount $(X_i - X_m)$ is equal to or greater than the line width LW. However, as shown in FIG. 19, they may be configured in such a manner that: a movement amount $X_{add}$ is obtained by cumulatively adding up X-coordinate data for each detection cycle DT, i.e., cumulatively adding up X-coordinate data $X_{i1}$ to $X_{i6}$; and it is determined whether or not the movement amount $X_{add}$ is equal to or greater than a length equivalent to the line width LW. In this case, the movement amount $X_{add}$ is initialized to "0" every time the movement detection signal DS rises.

Further, the above-described exemplary embodiments are configured in such a manner that when the press position of the finger 6 is identified, the press position is identified by simply adding/subtracting the predetermined amount r (see FIG. 6). However, for example, they may be configured in such a manner that: arithmetic processing "$X_{D1} + \{(X_{D2} - X_{D1})/2\}$" or "$X_{D2} - \{(X_{D2} - X_{D1})/2\}$" may be performed in the initial position detection unit 41 and/or the current position detection unit 43; and the center coordinate between the X-coordinate data $X_{D1}$ and the X-coordinate data $X_{D2}$ may be always obtained, and this value may be identified as the press position.

Further, although a CCD is used as an example of a line sensor that outputs the image signal IS in the above-described exemplary embodiments, the apparatus does not necessarily have to use a CCD. For example, other image-taking devices such as CMOS sensor may be used.

As described above, the image reading apparatus may include image sorting-out means for selectively making an image signal output from the line sensor effective based on the movement amount detected by the detection means, and storage means for storing the image signal that is made effective by the image sorting-out means.

As described above, in the image reading apparatus, the detection means may include a movement amount detection unit that refers to coordinate information output from the touch panel at regular intervals and detects that the movement amount of the press position of the subject to the sub-scanning direction has reached the line width of the line sensor, and the image sorting-out means may make the image signal output from the line sensor effective when the movement amount of the press position of the subject to the sub-scanning direction has reached the line width of the line sensor.

With the above-described configuration, it is possible to obtain a fingerprint image on a line-by-line basis in an orderly manner while preventing overlaps between images. Further, by generating the entire image by joining together a plurality of line-by-line image signals obtained in this manner, distortions are less likely to occur at the joints between images in comparison to the case where frame images (area images) are combined. Therefore, it is possible to obtain an excellent image with no or small distortion without using any distortion correction processing like the one used in the conventional technique.

As described above, in the image reading apparatus, the sensor conveyance means may include a motor that conveys the line sensor in the sub-scanning direction, and a motor driver that drives the motor based on a detection result of the movement amount detection unit and thereby conveys the line sensor on a line-by-line basis.

With the above-described configuration, it is possible to move the line sensor on a line-by-line basis according to the rotational movement of the subject and thereby appropriately change the position of the line sensor so as to follow the rotational movement of the subject.

As described above, in the image reading apparatus, the detection means may include a movement direction detection unit that detects the rotational movement direction of the subject based on coordinate information output from the touch panel, and a reverse detection unit that detects a reverse period in which the rotational movement direction of the subject is reversed, and a return period in which the subject is reversed again thereafter and returns to the original position based on the rotational movement direction detected by the movement direction detection unit and the coordinate information output from the touch panel, and the image sorting-out means may make all the image signal output from the line sensor ineffective in a period in which the reverse detection unit detects the reverse period or the return period, and selectively make the image signal output from the line sensor effective based on the movement amount detected by the detection means in a period in which the reverse detection unit detects neither the reverse period nor the return period.

With the above-described configuration, the reverse period in which the rotational movement direction of the subject is reversed and the return period in which the subject is reversed again thereafter and returns to the original position are detected, and the image signals are made ineffective in these periods. As a result, it is possible to discard, as appropriate, image signals that are generated in the period in which the subject is not rotationally moved in an appropriate manner, and thereby to prevent the joined image from being disturbed.

As described above, in the image reading apparatus, the line sensor may output the image signal at regular intervals, and the image sorting-out means may selectively make the image signal output from the line sensor at regular intervals effective in synchronization with the image signal output cycle of the line sensor based on the movement amount detected by the detection means.

With the above-described configuration, it is configured in such a manner that the line sensor is continuously driven in a constant cycle and a necessary image signal(s) is extracted as appropriate from its output image signals. Therefore, there is no need to control the drive timing of the line sensor in a complicated manner (for example, to monitor the movement amount of the subject and control the line sensor only when necessary), and thus making it possible to prevent the control sequence from becoming complicated. Further, since the effectiveness/ineffectiveness of the image signals can be switched in accordance with the signal output timing of the line sensor, it is possible to obtain an appropriate image signal(s) when the image signals are effective.

As described above, in the image reading apparatus, the subject may be a finger, and the surface image may be a rotational fingerprint image from one side to the other side of the finger.

This application is based upon and claims the benefit of priority from Japanese patent application No. 2010-216406, filed on Sep. 28, 2010, the disclosure of which is incorporated herein in its entirety by reference.

Industrial Applicability

The present invention can be used for systems that compare fingerprints.

REFERENCE SIGNS LIST

1 IMAGE READING APPARATUS
2 SCANNER HOUSING
3 READ UNIT
4 PLATEN GLASS
5 TOUCH PANEL
6 FINGER
11 LIGHT SOURCE
12 CCD
13 MIRROR
14 OPTICAL LENS
15 UNIT HOUSING
21 COORDINATE DETECTION MEANS
22 MOVEMENT DETECTION MEANS
23 CCD DRIVER
24 COMMAND RECEIVING UNIT
25 IMAGE SIGNAL PROCESSING UNIT
26 IMAGE SORTING-OUT MEANS
27 MEMORY
28 MOTOR
29 MOTOR CONTROL MEANS
31 TOUCH DETECTION UNIT
32 X-COORDINATE DATA GENERATION UNIT
41 INITIAL POSITION DETECTION UNIT
42 START POSITION CALCULATION UNIT
43 CURRENT POSITION DETECTION UNIT
44 MOVEMENT AMOUNT DETECTION UNIT
45 REVERSE DETECTION UNIT
51 SORTING-OUT UNIT
52 GATE UNIT
61 MOTOR DRIVER
62 START POSITION CONTROL UNIT
TD TOUCH DETECTION SIGNAL
XD X-COORDINATE DATA
RD DIRECTION SIGNAL
DS MOVEMENT DETECTION SIGNAL
BS REVERSE RETURN SIGNAL
SS IMAGE SELECT SIGNAL
φTG IMAGE OUTPUT SIGNAL
IS IMAGE SIGNAL
ID IMAGE DATA
MV INITIAL DRIVE VALUE

The invention claimed is:

1. An image reading apparatus that reads a surface image of a subject while rotationally moving the subject in a sub-scanning direction, comprising:
a touch panel that outputs a press position pressed by the subject as coordinate information in the sub-scanning direction, the subject being placed on a surface of the touch panel;
a line sensor that takes an image of the subject placed on the touch panel from a rear side of the touch panel in a main-scanning direction, and outputs an image signal;
a detection unit that detects a movement amount of the press position of the subject to the sub-scanning direction on the touch panel based on the coordinate information output from the touch panel; and
a sensor conveyance unit that moves the line sensor in the sub-scanning direction so as to follow a rotational movement of the subject based on the movement amount detected by the detection unit.

2. The image reading apparatus according to claim 1, further comprising:
an image sorting-out unit that selectively makes an image signal output from the line sensor effective based on a movement amount detected by the detection unit; and
a storage unit that stores the image signal that is made effective by the image sorting-out unit.

3. The image reading apparatus according to claim 2, wherein the detection unit comprises a movement amount detection unit that refers to coordinate information output from the touch panel at a regular interval, and detects that the movement amount of the press position of the subject to the sub-scanning direction has reached a line width of the line sensor, and
the image sorting-out unit makes the image signal output from the line sensor effective when the movement amount of the press position of the subject to the sub-scanning direction has reached the line width of the line sensor.

4. The image reading apparatus according to claim 3, wherein the sensor conveyance unit comprises: a motor that conveys the line sensor in the sub-scanning direction; and a motor driver that drives the motor based on a detection result of the movement amount detection unit and thereby conveys the line sensor on a line-by-line basis.

5. The image reading apparatus according to claim 2, wherein
the detection unit comprises: a movement direction detection unit that detects a rotational movement direction of the subject based on coordinate information output from the touch panel; and a reverse detection unit that detects a reverse period in which the rotational movement direction of the subject is reversed, and a return period in which the subject is reversed again thereafter and returns to an original position based on the rotational movement direction detected by the movement direction detection unit and the coordinate information output from the touch panel, and
the image sorting-out unit makes all the image signal output from the line sensor ineffective in a period in which the reverse detection unit detects the reverse period or the return period, and selectively makes the image signal output from the line sensor effective based on the movement amount detected by the detection unit in a period in which the reverse detection unit detects neither the reverse period nor the return period.

6. The image reading apparatus according to claim 2, wherein
the line sensor outputs the image signal at a regular interval, and
the image sorting-out unit selectively makes the image signal output from the line sensor at a regular interval effective in synchronization with an image signal output cycle of the line sensor based on the movement amount detected by the detection unit.

7. The image reading apparatus according to claim 1, wherein the subject is a finger, and the surface image is a rotational fingerprint image from one side of the finger to the other side of the finger.

8. An image reading method of reading a surface image of a subject while rotationally moving the subject in a sub-scanning direction, comprising:
outputting a press position pressed by the subject as coordinate information in the sub-scanning direction;
detecting, by a processor, a movement amount of the press position of the subject to the sub-scanning direction based on the coordinate information; and
moving a line sensor in the sub-scanning direction so as to follow a rotational movement of the subject based on the movement amount.

* * * * *